United States Patent
Aubarede et al.

(10) Patent No.: US 9,115,447 B2
(45) Date of Patent: Aug. 25, 2015

(54) DEVICE AND METHOD FOR EXTRACTING WEFTS IN A REINFORCING PLY INTENDED FOR THE MANUFACTURE OF A TIRE

(71) Applicants: COMPAGNIE GENERALE DES ETABLISSEMENTS MICHELIN, Clermont-Ferrand (FR); MICHELN RECHERCHE ET TECHNIQUE, S.A., Granges-Paccot (CH)

(72) Inventors: Francis Aubarede, Clermont-Ferrand (FR); Christophe Hombert, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/347,836
(22) PCT Filed: Sep. 27, 2012
(86) PCT No.: PCT/EP2012/069154
§ 371 (c)(1),
(2) Date: Mar. 27, 2014
(87) PCT Pub. No.: WO2013/050298
PCT Pub. Date: Apr. 11, 2013

(65) Prior Publication Data
US 2014/0238527 A1      Aug. 28, 2014

(30) Foreign Application Priority Data
Oct. 6, 2011   (FR) ...................................... 11 59016

(51) Int. Cl.
*D03D 49/00* (2006.01)
*B29D 30/38* (2006.01)
(Continued)

(52) U.S. Cl.
CPC . *D03J 1/04* (2013.01); *B29D 30/46* (2013.01); *D03D 49/70* (2013.01); *D03D 51/085* (2013.01)

(58) Field of Classification Search
CPC ..... D03D 51/085; D03D 47/34; D03D 51/00; D03D 51/08; D03D 2700/1431; D03D 2700/1495; D03D 47/3086; D03D 49/70; B29L 2030/00
See application file for complete search history.

(56) References Cited

U.S. PATENT DOCUMENTS 3,727,647 A * 4/1973 Laval ............................ 139/439
3,885,599 A * 5/1975 Mawdsley et al. .......... 139/435.3
(Continued)

FOREIGN PATENT DOCUMENTS

| EP | 1780330 A2 | 5/2007 |
| JP | 1995034379 | 2/1995 |
| WO | 2005005718 A1 | 1/2005 |

OTHER PUBLICATIONS

International Search Report for PCT/EP2012/069154 dated Oct. 22, 21012.
(Continued)

*Primary Examiner* — Bobby Muromoto, Jr.
(74) *Attorney, Agent, or Firm* — Dickinson Wright PLLC

(57) ABSTRACT

Device intended for extracting weft threads (T) arranged transversely in a straight grain reinforcing ply (F) comprising a hook capable of gripping a weft thread (T) by performing an alternating movement between a high position and a low position, characterized in that the hook engages with a disengageable anvil capable of moving along the path (XX') of the hook so that when the device is in operation, the anvil is engaged in contact with the hook during all or part of the descending movement of said hook, forming a clamp capable of holding a section of weft between the hook and the anvil the anvil is disengaged from contact with said hook during the remainder of the travel of the hook, so as to enable the hook to engage a weft thread (T) and to release a section of weft (T).

15 Claims, 2 Drawing Sheets

(51) Int. Cl.
  *D03J 1/04*     (2006.01)
  *B29D 30/46*    (2006.01)
  *D03D 49/50*        (2006.01)
  *D03D 51/08*        (2006.01)
  *D03D 49/70*        (2006.01)

(56)          References Cited

U.S. PATENT DOCUMENTS

| 3,996,971  | A   | * | 12/1976 | Griffith et al. | 139/431   |
|------------|-----|---|---------|-----------------|-----------|
| 4,062,382  | A   | * | 12/1977 | Rohr et al.     | 139/448   |
| 4,230,158  | A   | * | 10/1980 | Hintsch         | 139/1 C   |
| 4,502,512  | A   | * | 3/1985  | Suzuki et al.   | 139/116.2 |
| 4,858,656  | A   | * | 8/1989  | Suwa            | 139/116.2 |
| 4,898,214  | A   | * | 2/1990  | Lewyllie et al. | 139/116.2 |
| 4,938,268  | A   | * | 7/1990  | Shaw            | 139/116.2 |
| 4,967,803  | A   | * | 11/1990 | Pajgrt et al.   | 139/116.2 |
| 4,974,640  | A   | * | 12/1990 | Shaw            | 139/116.2 |
| 5,060,699  | A   | * | 10/1991 | Velechovsky     | 139/116.2 |
| 5,199,468  | A   | * | 4/1993  | Aarts et al.    | 139/450   |
| 5,209,271  | A   | * | 5/1993  | Takegawa        | 139/116.2 |
| 5,246,037  | A   | * | 9/1993  | Degen et al.    | 139/116.2 |
| 5,335,700  | A   | * | 8/1994  | Ishido et al.   | 139/435.1 |
| 5,950,684  | A   | * | 9/1999  | Degen et al.    | 139/28    |
| 6,014,797  | A   | * | 1/2000  | Kuster et al.   | 28/146    |
| 6,136,014  | A   | * | 10/2000 | Sirimanne et al.| 606/185   |
| 6,213,161  | B1  | * | 4/2001  | Schaich         | 139/28    |
| 7,168,456  | B1  | * | 1/2007  | Kuster et al.   | 139/170.4 |
| 2003/0200635 | A1 | * | 10/2003 | Kuster et al.  | 26/10.4   |
| 2008/0000541 | A1 | * | 1/2008  | Kutzleb et al. | 139/116.2 |
| 2009/0158575 | A1 | * | 6/2009  | Currie et al.  | 29/428    |
| 2009/0249597 | A1 | * | 10/2009 | Tatara et al.  | 28/170    |

OTHER PUBLICATIONS

Japanese First Office Action for Patent Application No. 201280049053.1 dated Nov. 2, 2014.

* cited by examiner

DEVICE AND METHOD FOR EXTRACTING WEFTS IN A REINFORCING PLY INTENDED FOR THE MANUFACTURE OF A TIRE

This application is a 371 of PCT/EP2012/069154, filed 27 Sep. 2012, which claims benefit under 35 U.S.C. §119 of the filing date of French patent application 1150916, filed 6 Oct. 2011, the entire contents of which is incorporated herein by reference for all purposes.

BACKGROUND

1. Field

The disclosure relates to the manufacture of tires and focuses more specifically on the processing of the reinforcing plies produced from textile threads.

2. Description of Related Art

These plies are formed by sections of threads embedded in rubber and are arranged at a given angle in relation to the circumferential direction of the tire.

In a known manner, the manufacture of the reinforcing plies takes place on the basis of plies of threads, known as straight-thread plies, in which the continuous threads are arranged side by side, according to a given pitch, in a direction parallel to the longitudinal direction of the ply. The threads of the ply are embedded in the rubber, for example by means of a calender.

The threads of the straight-thread ply may be subjected to pre-treatment in order to favour the adhesion of the rubber to the thread.

In addition, in a routine manner, these straight-thread plies include sections of threads, referred to as weft threads, arranged in the direction perpendicular to the longitudinal direction of the straight-thread ply, of which the threads may be considered as warp threads. The purpose of the weft threads is to maintain the threads of the straight-thread ply in position during the handling operations of said plies.

It can be appreciated, however, that the presence of the weft may prove to be inconvenient during subsequent operations in the manufacture of the tire. In effect, when these threads are present in a ply intended to form the carcass-reinforcing ply, they may cause irregularities in the spacing of the reinforcing threads at the level of the crown portion. This can be explained by the fact that the weft threads act against an increase in the spacing pitch of the reinforcing threads in this zone in the course of the conformation operation, the purpose of which is to transform the tire blank from a generally cylindrical shape into a toroidal shape.

The manufacturers are also committed to reducing this disadvantage by fragmenting and/or by withdrawing the weft threads during a stage preceding the embedding of the reinforcing threads in their rubber matrix.

Devices intended for this purpose have been developed by the industry. Thus, publication JP7-34379 describes a system of rotating knives capable of cutting the wefts into sections of a given size, interacting with claws mounted on a rotating disc and intended to hook onto and to extract the sections of wefts. Publication JP5-200910 describes a similar system in which the claws may be mounted on an axis executing a rectilinear movement.

One or a plurality of these devices are thus arranged with regular spacing in the direction transversal to the direction of the straight-thread ply downstream of cutting means capable of dissecting the weft threads in order to extract the wefts prior to the calendering operation, in the course of which the reinforcing threads are embedded in rubber.

It should be noted, however, that, although these devices permit the removal of the majority of the sections of weft, some sections of weft will remain intertwined in an irregular manner with the reinforcing threads. In addition, on emerging from the calendering operation, these weft residues constitute local thickenings and aggregates with the potential to weaken the bridges of rubber formed between the reinforcing threads.

SUMMARY

An object of embodiments of the present disclosure to provide a device capable of reducing the disadvantages outlined above.

The device intended for extracting weft threads according to the embodiments disclosed herein comprises a hook capable of gripping a weft thread by performing an alternating movement between a high position and a low position. This device is characterized in that the hook engages with a disengageable anvil capable of moving along the path of the hook so that, when the device is in operation,
   the anvil is engaged in contact with the hook during all or part of the descending movement of said hook, thereby forming a clamp capable of holding a section of weft between the hook and the anvil,
   the anvil is disengaged from contact with said hook during the remainder of the travel of the hook, in such a way as to enable the hook to engage a weft thread and to release a section of weft.

The result of this particular arrangement is that the section of weft thread is gripped in the first instance by the hook. During the descending movement of the hook, the section of weft extracted from the ply is then pinched between the hook and the anvil. As a result of this, the imbalance in the tensions, which arise at the two free extremities of said section and result from rubbing of the weft on the warp threads, no longer causes said section to escape from the hook. Being held firmly between the hook and the anvil, the section of weft may then be extracted completely from the weft threads, and it may be removed from the device after having released the contact between the hook and the anvil.

According to a preferred embodiment, the path of the hook is rectilinear. The hook may be mounted on a rod supported by a shaft sliding in a conduit arranged in a fixed chassis and driven in an alternating upward and downward movement.

An anvil that is slidably mounted on the rod supporting the hook, as well as an elastic element situated between the anvil and an abutment arranged on the shaft, so that the anvil is subjected to a force with the aim of bringing said anvil in the direction of the hook, can usefully be proposed.

It is likewise possible to provide a movable pawl mounted on the chassis, said pawl being capable of engaging the anvil mechanically in such a way as to restrain the movement of said anvil during the return movement of the sliding shaft in the upward direction, and being mounted on the chassis by means of an elastic articulation.

For the purpose of actuating the pawl, it is possible to provide a cam arranged on the supporting shaft which engages with a shoulder located on the pawl so that:
   the pawl is released from its mechanical engagement with the anvil when the cam moves away from the body of the chassis,
   the pawl engages mechanically on the anvil under the effect of the elastic articulation when the cam approaches the chassis body.

With a view to the geometrical regulation of the position of the straight-thread ply in relation to the hook, the chassis may usefully include a table intended to receive the straight-thread ply on its upper surface and including an orifice through which the hook moves; this being the case, the travel of the anvil is limited by the lower surface of the table.

The disclosed embodiments also relate to a machine intended for extracting wefts, comprising one or a plurality of devices intended for extracting according to the embodiment arranged transversely along the direction of movement of a ply made of straight-thread reinforcing threads.

Cutting elements capable of cutting the weft threads can also be usefully arranged upstream of the devices intended for extracting.

It may also be advantageous to provide blowing means oriented in such a way as to generate an air current capable of evacuating the sections of weft once the latter have been released from the clamp formed by the hook and the anvil.

In order to facilitate the passage of the hook, it may be advantageous to arrange a splitter downstream of each of the devices intended for extracting that is capable of separating the reinforcing threads.

Finally, the embodiments disclosed herein relate to a method for extracting a weft thread in which use is made of a device and a machine having the following characteristics.

BRIEF DESCRIPTION OF DRAWINGS

The following description is based on FIGS. 1 to 3, in which.

DETAILED DESCRIPTION OF SPECIFIC EMBODIMENT

Figure 1:
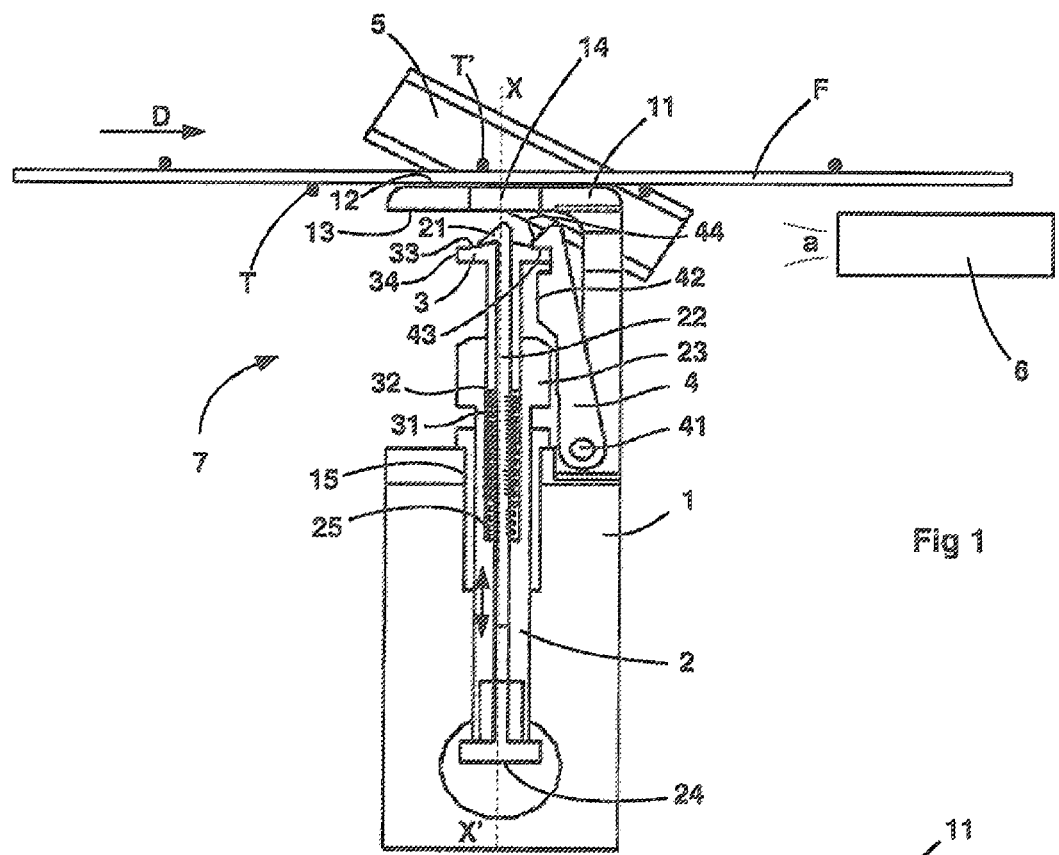
FIG. 1 represents a schematic view in cross section of a device according to a preferred embodiment.
Figure 2:
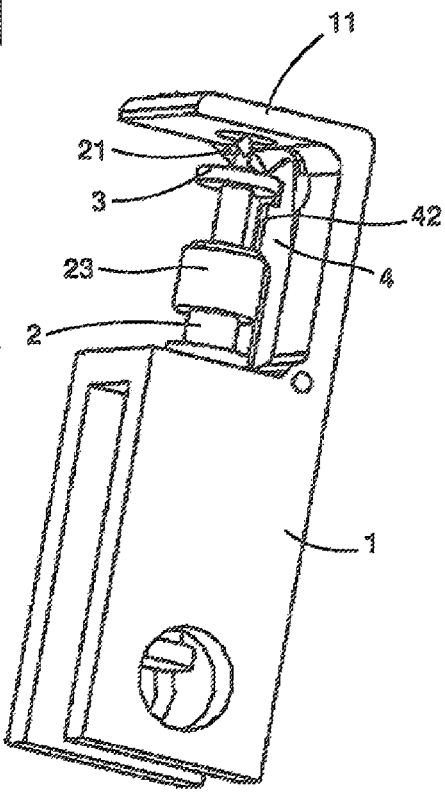
FIG. 2 represents a schematic view of the device.

A preferred embodiment of a device 7 described herein is illustrated in FIG. 1. FIG. 2 permits the different components to be visualized in three dimensions.

This device 7 intended for extracting comprises a chassis body 1 on which the different components are arranged. A rectilinear supporting shaft 2 moves along an axis XX' inside a bore provided in the chassis 1. A sleeve 15, serving as a conduit, permits the guiding of the supporting shaft 2 and the reduction of wear phenomena. The supporting shaft 2 is driven via its lower part 24 according to an alternating upward and downward movement with the help of a transmission connected to a motor (not illustrated here).

A rod 22, coaxial to the supporting shaft, is fixed to the motor shaft at one of its extremities and has a hook 21 at its other extremity. The hook 21 is thus subjected to the alternating upward and downward movements imparted by the supporting shaft 2.

An anvil 3, coaxial to the rod 22 and to the supporting shaft 2, is slidably mounted on said rod 22. An elastic element, in this case a spring 31, is interposed between the low part 32 of the anvil 3 and an abutment 25 arranged on the movable shaft 2. The head of the anvil 3, under the action of the spring 31, moves into a position in which it is supported on the hook 21.

A pawl 4 is connected to the chassis body 1 by means of an elastic articulation 41. The pawl 4 tilts in the direction of the anvil 3 under the effect of the elastic return forces. The free extremity of the pawl includes a catch 43, the shape of which is adapted to come into mechanical engagement with the anvil 3. The end part of the pawl carries an inclined surface 44 intended to interact with the lateral face 34 of the anvil, as will be explained in detail below.

A cam 23 is arranged on the supporting shaft 2, in such a way as to engage with a shoulder 42 provided on the pawl 4. Thus, when the cam 23 engages with said shoulder 42, the pawl 4 is forced to dissociate itself from the anvil and to release the movement of said anvil in the direction of the hook.

The chassis 1 likewise carries a table 11 intended to receive a straight-thread ply F containing weft threads T and which moves on the upper surface 12 of the table 11 in the direction of the arrow D.

An orifice 14 is provided in the table at the level of the trajectory of the hook, in such a way as to enable the hook 21 to gain access to the upper part of the ply in order to grip a section of weft thread as it descends once again.

Blowing means 6, situated beneath the table 11, are oriented in such a way as to generate an air current capable of evacuating the sections of weft that are released when the hook and the anvil are no longer in contact one with the other.

The device intended for extracting as described above is intended to be mounted on a machine, preferably situated immediately upstream of the calendering machine.

As a function of the width of the straight-thread ply, the number and the position of the devices 7 intended for extracting are adjusted so that all the wefts may be extracted in the course of the advancement of the ply.

A splitter (not illustrated here) can usefully be provided downstream of the devices intended for extracting, after having cut and extracted the weft thread, for the purpose of keeping the reinforcing threads separated in order to facilitate the passage of the hook 21, and to avoid degradation of the reinforcing threads.

The machine contains a sufficient number of cutting elements 5, inserted between the devices intended for extracting, to enable the weft threads to be cut upstream of the axis XX' of the trajectory of the hook.

It should be noted here that, the more the number of devices intended for extracting is reduced, the more the length of the sections of weft is increased. It follows that the course of the hook must be lengthened in order to permit the complete extraction of said section, to the detriment of the cycle time of the device intended for extracting and, as a result, the rate of advancement of the straight-thread ply.

The object of FIGS. 3a to 3j is to illustrate the different positions of the principal moving components of the device. In the interests of making the diagrams easier to understand, reference may usefully be made to FIG. 1 in order to identify the numerical references that are utilized in the description of an operating cycle of the kind contained in the following paragraphs.

Figures 3A, 3B, 3C, 3D, 3E:
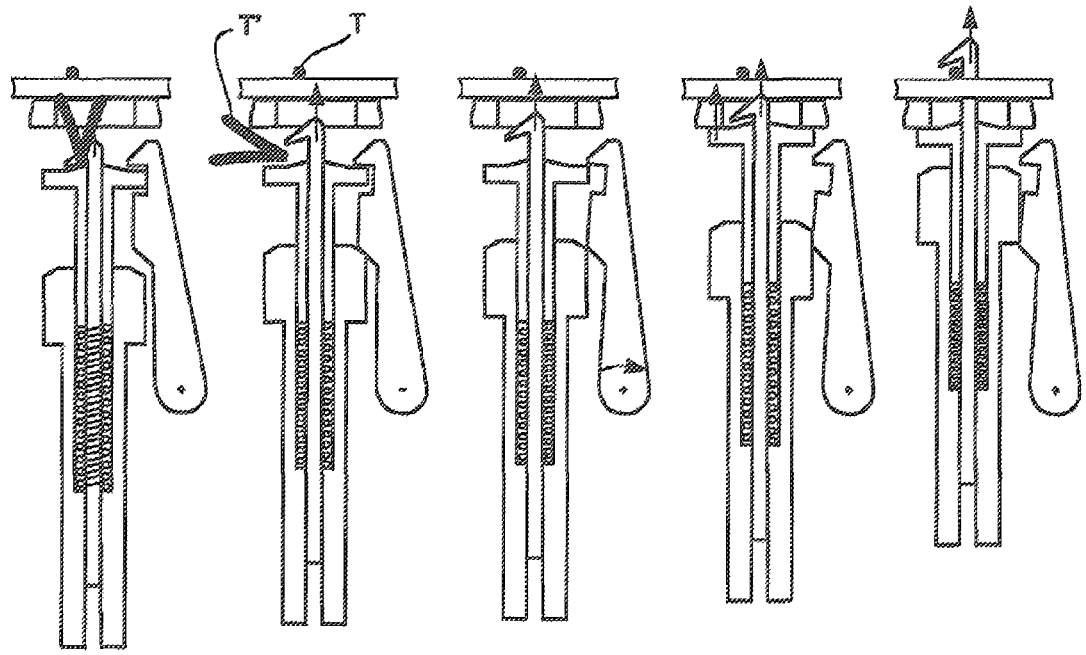
FIGS. 3a to 3j represent simplified schematic views of a device according to an embodiment in the different stages of an operating cycle.

FIG. 3a represents the device when the hook 21 is in the low position. It should be noted that a section of weft T deriving from the preceding extraction cycle is still trapped between the hook and the anvil. When the supporting shaft 2 begins its return movement in the upward direction in the direction of the table (see the direction of the arrow), the pawl 4 is in engagement with the anvil 3 and restrains the movement of the anvil. The spring 31 is placed in compression.

As it continues on its course in the direction of the return movement in the upward direction, as illustrated in FIG. 3b, the anvil 3 continues to be restrained by the pawl 4. The hook 21 rises up independently of the anvil and releases the section of weft. The air current coming from the blowing means 6 evacuates said section towards a receptacle (not illustrated here). The cam 23 situated on the supporting shaft 2 begins to engage the shoulder 42 of the pawl 4.

The stage illustrated in FIG. 3c represents the moment in the cycle at which the pawl 4 releases the anvil, which, under the effect of the spring 31, is propelled in the direction of the table 11.

Once the anvil has been released, the upper surface 33 of the anvil 3 comes into abutment against the lower surface 13 of the table 11, as illustrated in FIG. 3d. The cam engages the shoulder 42 completely, and the pawl 4 is maintained in its open position. The hook 21 continues to rise and penetrates into the orifice 14 provided in the table 11.

FIG. 3e illustrates the configuration of the device when the supporting shaft 2 is in the high position. The cam 23 remains engaged with the shoulder 4. The hook 21 is passed beneath the straight-thread ply F in such a way as to position itself beneath a section of weft T previously cut by the knife 5. The anvil 3 is still in abutment against the lower surface 13 of the table 11.

Figures 3F, 3G, 3H, 3I, 3J:
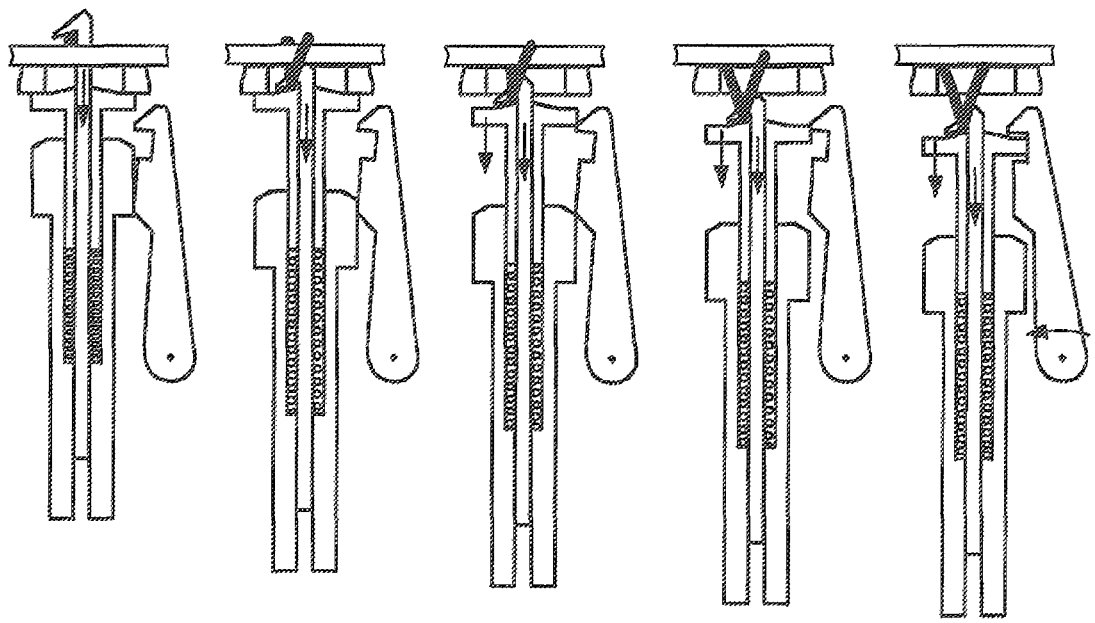

On initiating its descent, as illustrated in FIG. 3f, the hook 21 carries the section of weft T with it.

As it continues on its descent in the direction of the chassis, as illustrated in FIG. 3g, the hook 21 carries the anvil 3 with it on its path, in such a way that this assembly forms a clamp in which the section of weft is trapped between the upper surface 33 of the anvil and the hook 21. The force of compression of the spring 31 maintains these two components (33, 21) in contact with one another and prevents the section of weft from escaping.

The continuing descent of the supporting shaft brings the anvil into contact with the end part 44 of the pawl 4. The cam 23 then begins to disengage from the shoulder 42 with reference to FIG. 3h. The section of weft remains firmly held between the hook and the anvil.

FIG. 3i represents the moment in the cycle at which the catch 43 of the pawl is free to engage the upper surface 33 of the anvil 3.

Under the effect of the elastic articulation 41, the pawl tilts in the direction of the anvil and the catch 43 connects with the latter. The inclination of the terminal part 33 of the pawl and of the anvil 3 are preferably adjusted in such a way that the pawl comes into engagement with the anvil in a position close to the low position of the supporting shaft 2.

FIG. 3j represents the state of the device in the low position, equivalent to that of FIG. 3a. The pawl is in engagement with the anvil 3. The section of weft is still trapped between the anvil and the hook.

The supporting shaft may then initiate its return movement in the upward direction by reproducing the cycle in the manner described above in order to release the section of weft of the preceding cycle, and to extract a new section of weft.

The method for extracting a weft thread, in which use is made of a device of the kind described above, comprises the stages as illustrated by FIGS. 3a to 3j.

After reading the above, a person skilled in the art can easily adjust the paths and the respective positions of the different moving components in relation to one another in order to achieve an equivalent result.

It is also possible, by way of example, to adapt the device by modifying the axial position of the cam 23 or, alternatively, by modifying the length of the shoulder 42, in order to increase or reduce the path over which the hook 21 returns in the upward direction while the anvil is retained by the pawl 4.

It goes without saying that the embodiment described above is not exclusive, and that it is possible to achieve equivalent functions by modifying the shape or the position of certain components.

Thus, by way of example, it is entirely possible to substitute a pawl having rectilinear displacement for the pawl having rotating displacement, and to modify the shape and the point of attachment between the pawl and the anvil.

Similarly, a device containing rotating hooks interacting with an anvil during the extraction of the weft thread, and capable of disengagement for the rest of the trajectory of the hook, would likewise come within the scope of the invention.

The invention claimed is:

1. A device intended for extracting weft threads (T) arranged transversely in a ply made of straight-thread reinforcing threads (F) comprising:
    a hook capable of gripping a weft thread (T) by performing an alternating movement between a high position and a low position,
    a disengageable anvil capable of moving along a path (XX') of the hook so that, when the device is in operation,
        the anvil is engaged in contact with the hook during all or part of the descending movement of said hook, thereby forming a clamp capable of holding a section of weft between the hook and the anvil, and
        the anvil is disengaged from contact with said hook during the remainder of the travel of the hook, whereby the hook is able to engage a weft thread (T) and to release a section of weft (T').

2. The device intended for extracting according to claim 1, wherein the path (XX') of the hook is rectilinear.

3. The device intended for extracting according to claim 2, wherein the hook is mounted on a rod supported by a shaft sliding in a conduit arranged in a fixed chassis and driven in an alternating upward and downward movement.

4. The device intended for extracting according to claim 3 wherein the anvil is slidably mounted on the rod supporting the hook.

5. The device intended for extracting according to claim 4, wherein an elastic element is situated between the anvil and an abutment arranged on the shaft, so that the anvil is subjected to a force with the aim of bringing said anvil in the direction of the hook.

6. The device intended for extracting according to claim 4, wherein a movable pawl is mounted on the chassis and is capable of engaging the anvil mechanically, whereby the movement of said anvil is restrained during the return movement of the sliding shaft in the upward direction.

7. The device intended for extracting according to claim 6, wherein the pawl is mounted on the chassis by means of an elastic articulation.

8. The device intended for extracting according to claim 7, wherein a cam is arranged on the supporting shaft, which engages with a shoulder located on the pawl (4) wherein:
    the pawl is released from its mechanical engagement with the anvil when the cam moves away from the body of the chassis and
    the pawl engages mechanically on the anvil under the effect of the elastic articulation when the cam descends once again in the direction of the chassis body.

9. The device intended for extracting according to claim 8, wherein the chassis supports a table intended to receive the straight-thread reinforcing threads (F) on an upper surface thereof, and contains an orifice through which the hook moves.

10. The device intended for extracting according to claim 9, wherein travel of the anvil is limited by a lower surface of the table.

11. A machine intended for extracting of wefts, comprising one or a plurality of devices intended for extracting according to claim 1, arranged transversely along the direction of movement of a ply made of straight-thread reinforcing threads (F).

12. The machine for extracting weft according to claim 11, further comprising cutting elements, capable of cutting the weft threads (T), arranged upstream of the one or plurality of devices intended for extracting.

13. The machine for extracting weft according to claim 11, further comprising blowing means oriented in such a way as to generate an air current capable of evacuating sections of weft.

14. The machine for extracting weft according to claim 11, further comprising a splitter situated downstream of each of the devices intended for extracting that is capable of separating the reinforcing threads in such a way as to facilitate the passage of the hook.

15. A method for extracting a weft thread, comprising extracting a weft thread from a ply made of straight-thread reinforcing threads using a device according to claim 1.

* * * * *